United States Patent Office 3,405,075
Patented Oct. 8, 1968

3,405,075
NONFLAMMABLE PHOSPHORUS-CONTAINING POLYMERS
Frank J. Welch, Charleston, and Herbert J. Paxton, Jr., Elkview, W. Va., assignors to Union Carbide Corporation, a corporation of New York
No Drawing. Filed July 29, 1964, Ser. No. 386,060
36 Claims. (Cl. 260—2)

ABSTRACT OF THE DISCLOSURE

Nonflammable polymers containing phosphonite or phosphite groups and the corresponding rearranged nonflammable polymers containing phosphinate and phosphonate groups are claimed. The polymers react with mono-alcohols, mono-mercaptans, primary amines or monomeric oxirane mono-epoxides to yield terminally altered polymers which are subsequently crosslinked. The claimed phosphorus containing polymers are useful as adhesives, liquid flame retardant plasticizers, stabilizers and in the production of molded articles.

---

This invention relates to phosphorus-containing polymers. More particularly, this invention relates to nonflammable polymers containing phosphonite or phosphite groups and to nonflammable polymers containing phosphinate or phosphonate groups derived therefrom.

The nonflammable polymers of this invention are prepared by reacting and polymerizing a compound having the formula:

$$RPX_2$$

wherein R, P and X are as subsequently defined, with an epoxide having an epoxy equivalency of two, hereinafter referred to as a diepoxide.

In the formula $RPX_2$, P is trivalent phosphorus, X is any halogen, e.g., chlorine, bromine, and iodine, and R is a monovalent hydrocarbon radical, generally containing from one to 18 carbon atoms inclusive, and preferably containing from one to 12 carbon atoms inclusive. Illustrative of suitable monovalent hydrocarbon radicals, which can be substituted or unsubstituted, are the following: alkyl radicals, as for example, methyl, ethyl, n-propyl, n-butyl, n-hexyl, 2-ethylhexyl, n-octyl, n-octadecyl and the like; alkoxy radicals, as for example, methoxy, ethoxy, propoxy, and the like; cycloaliphatic radicals, as for example, cyclohexyl and the like; unsaturated aliphatic and cycloaliphatic radicals, as for example, allyl, cyclopentenyl and the like; alkoxy and aryloxy substituted aliphatic and cycloaliphatic radicals, as for example, methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxycyclohexyl and the like; aralkyl radicals, as for example, benzyl, 2-phenylethyl, 3-phenyl-n-propyl, 1-phenyl-n-butyl, 1-phenyl-n-dodecyl and the like; aryl radicals, as for example, phenyl, naphthyl and the like; alkoxy and aryloxy substituted aryl radicals, as for example, p-methoxyphenyl, p-ethoxyphenyl, phenoxyphenyl and the like; alkaryl radicals, as for example, o-methylphenyl, p-ethylphenyl, p-n-propylphenyl, o-n-propylphenyl, o-n-butylphenyl, p-n-dodecylphenyl, p-(2-ethylhexyl)phenyl and the like. Other suitable radicals include thioalkyl, such as methylmercaptyl and the like; dialkylamino, such as diethylamino and the like; halogenated radicals, as for example, 2-chloroethoxy, p-chlorophenyl and the like.

In the interest of brevity, hereinafter the term "dihalophosphine" will be employed to designate those dihalo organo phosphorus compounds in which the R group contains a carbon atom attached directly to the trivalent phosphorus atom, as for example, when R is alkyl, and the term "dihalophosphite" will be employed to designate those dihalo organo phosphorus compounds in which the R group contains an oxygen atom attached directly to the trivalent phosphorus atom.

Diepoxides suitable for purposes of this invention are those organic compounds having an epoxy equivalency of two, that is, compounds having an average of two epoxy groups per molecule. These compounds, wherein the oxygen of the epoxy group is attached to vicinal carbon atoms, can be saturated or unsaturated, aliphatic, cycloaliphatic or heterocyclic and can be substittued with substituents such as halogen atoms, alkyl groups, ether groups and the like.

Illustrative of diepoxides which can be reacted in accordance with this invention are the diglycidylethers of dihydric phenols, exemplified by the diglycidylethers of phenols such as the mononuclear dihydric phenol, resorcinol; the di- or polynuclear phenols such as the bisphenols described by Bender et al. in U.S. Patent 2,506,486. The phenols may contain substituents such as alkyl, aryl or halogen substituents, as exemplified by the alkyl resorcinols, tribromo resorcinol and the diphenols containing alkyl and halogen substituents on the aromatic rings (Bender et al., U.S. Patent 2,506,486). The dihydric polynuclear phenols can be made up of two phenolic groups connected by such groups as alkylene, alkylidene and sulfone. The connecting groups are further exemplified by bis(p-hydroxyphenyl)propane and dihydroxydiphenylsulfone.

Particularly desirable for purposes of this invention are the diglycidylethers of the bis(hydroxyphenyl)alkanes, as for example, diglycidylether of 2,2-bis(p-hydroxyphenyl)propane and the diglycidylether of bis(p-hydroxyphenyl)methane. Other suitable diglycidylethers of dihydric phenols are enumerated in U.S. Patent 2,633,458 to E. C. Shokal.

Also suitable are the diglycidylethers of dihydric alcohols such as the reaction products of epichlorohydrin and an alcohol containing two hydroxy groups, such as ethylene glycol, propane diols, butane diols and the like. Methods of preparing diglycidylethers of dihydric alcohols are described in U.S. Patent 2,898,349 to P. Zuppinger et al.

Other suitable diglycidyl compounds are the diglycidylesters of polycarboxylic acids such as the diglycidylesters of adipic acid, phthalic acid and the like. Diglycidylesters of dibasic acids are described in detail in U.S. Patent 2,870,170 to Payne et al. Also suitable are the diglycidylamines produced by reacting epichlorohydrin with aromatic amines such as aniline, 2,6-dimethyl aniline and the like.

The so-called peracetic acid epoxides which are obtained by epoxidation across a double bond using, for example, peracetic acid, such as bis(2,3-epoxycyclopentyl)ether, dipentene dioxide, 3,4-epoxy-6-methylcyclohexylmethyl-3,4-epoxy-6 - methylcyclohexanecarboxylate, bis(3,4-epoxy-6-methylcyclohexylmethyl)adipate, vinylcyclohexene dioxide, bis(3,4 - epoxy-6-methylcyclohexylmethyl)maleate, dicyclopentadiene diepoxide and the like also are suitable diepoxides for the purposes of this invention.

The polymerization reaction which results in the formation of the phosphonite or phosphite-containing polymers of this invention is exothermic and is initiated by simply admixing the desired amounts of each reactant in a suitable reaction vessel. However, as the polymerization reaction is exothermic, the reaction is preferably conducted in the presence of an organic diluent which will absorb the heat of reaction. The polymerization is conveniently conducted by adding one component, either the diepoxide or the phosphorus containing compound, e.g., dihalophosphines or dihalophosphites, to a quantity of suitable diluent containing the remaining component. The addition, which may be made either batchwise or dropwise, is preferably made dropwise over a short period of time, the rate of addition depending upon the reactivity of the diepoxide and the amount of reactants employed. Depending upon the reactivity of the diepoxide, the rate of addition, and the temperature at which the polymerization is allowed to proceed, the polymerization is completed usually within a few minutes.

Diluents, when employed, which are suitable for use in this invention are those organic compounds which are normally liquid at ambient temperature and pressure, are inert to the reactants and product and which generally have boiling points below about 200° C. Illustrative of suitable diluents are aromatic hydrocarbons, as for example, benzene, toluene and the like; chlorinated hydrocarbons, as for example, methylene chloride, ethylene dichloride, butyl chloride, chlorobenzene and the like; aliphatic and aromatic esters, as for example, ethyl acetate, methyl benzoate, butyl acetate and the like; ethers, as for example, ethyl ether, dibutyl ether, tetrahydrofuran, dioxane and the like; amides, as for example, N,N-dimethylformamide, N-methylpyrrolidone and the like; tertiary amines, as for example, trimethylamine, triethylamine, pyridine and the like.

While the reaction of dihalophosphines and dihalophosphites with diepoxides is exothermic and can be conducted, generally, without the external application of heat, such external heat can be applied to the reaction system following the dissipation of the heat of reaction, in order to insure completeness of reaction. To insure completeness of reaction, the reaction mixture can be heated at temperatures of from about 30° C. to temperatures below the rearrangement temperature of the polymer for periods of from about one to about eight hours.

The polymerization reaction to produce the phosphorus-containing polymers is, as previously stated, exothermic. During the course of the polymerization due to the ability of the phosphonite and phosphite-containing polymers to rearrange at temperatures generally in excess of about 110° C. to polymers containing phosphinate or phosphonate linkages, the reaction temperature is maintained below the rearrangement temperature of the polymer. Control of the temperature is conveniently maintained by external cooling means.

It is also preferred to conduct the polymerization reaction under an atmosphere of an inert gas such as nitrogen and the like.

In conducting the reactions between the dihalo organo phosphorus compound and diepoxides, various amounts of reactants can be used, as a rule the dihalo organo phosphorus compound and the diepoxide being present in equimolar amounts. Generally, the dihalo organo phosphorus compound can be present in an amount of from about 0.5 mole per mole of diepoxide to about two moles per mole of diepoxide present, depending upon the character of the terminal groups desired in the polymeric product. Greater or lesser amounts of the reactants may be employed than those amounts set forth; however, the ranges denoted previously are the most desirable.

When equimolar amounts of $RPX_2$ and diepoxide are employed, the repeating unit of the polymer can be represented as indicated in Reaction 1 wherein the epoxide groups of the diepoxide are terminal groups.

Reaction 1

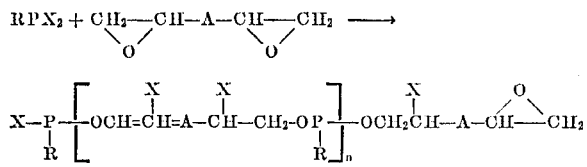

wherein R and X are as previously defined, A is any group linking the two epoxy groups and $n$ is an integer having a value of at least one, generally from one to 100.

When less than one mole of $RPX_2$, per mole of diepoxide, is used the repeating unit of the polymer can be represented as indicated in Reaction 2 wherein the epoxy groups of the diepoxide are terminal groups.

Reaction 2

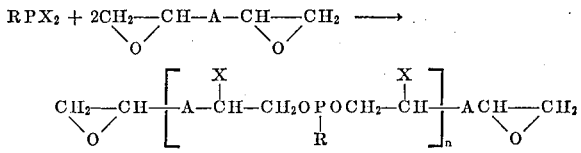

wherein R, X, A and $n$ are as previously defined.

When more than one mole of $RPX_2$, per mole of diepoxide, is employed, the repeating unit of the polymer can be represented as indicated in Reaction 3 wherein the epoxy groups of the diepoxide are terminal groups.

Reaction 3

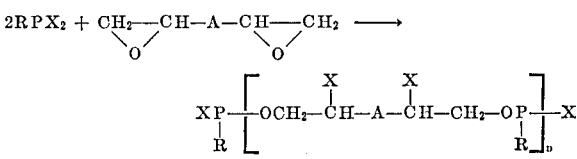

wherein X, R, A and $n$ are as previously defined.

Recovery of the polymers containing the phosphonite or phosphite groups from the reaction mixture can be accomplished in any convenient manner, as for example, by distilling off the volatiles or by precipitation from solution by admixing with a non-solvent for the polymer.

The polymers produced when utilizing equimolar amounts of reactants, in the preparation thereof, can be used as adhesives, as liquid flame retardant plasticizers and stabilizers for such polymers as poly(vinylchloride), as protective coatings, and also in molding applications wherein they can be formed into structures of desired shape.

The polymers produced when utilizing more than one mole of dihalo organo phosphorus compound per mole of diepoxide can be reacted with mono-alcohols such as the lower alkanols and the like, epoxides such as propylene oxide and the like, mercaptans such as methyl mercaptan and the like, amines such as aniline and the like, to produce polymers which containing desirable substituents such as nitrogen atoms, sulfur atoms and the like.

The terminal addition of alcohols, amines, epoxides, and mercaptans to the polymer proceeds in the following manner wherein the terminal portion of the polymer of Reaction 1 is shown.

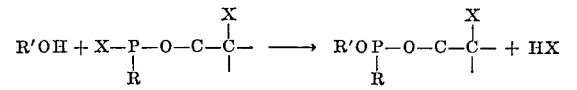

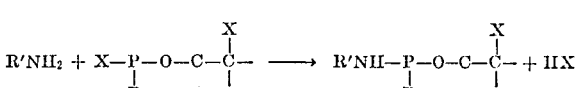

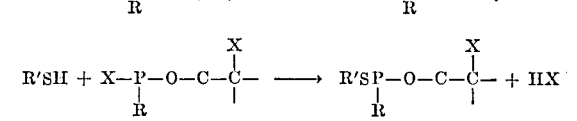

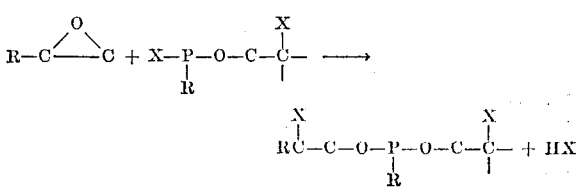

These terminally altered polymers find utility as adhesives, as liquid flame retardant plasticizers and stabilizers for such polymers as poly(vinylchloride), as protective coatings, and also in molding applications wherein they can be formed into structures of desired shape.

The polymers produced when utilizing less than one mole of dihalo organo phosphorus compound per mole of diepoxide can be reacted further with epoxy curing agents such as diethylenetriamine to form nonflammable epoxy resins. These epoxy resins can be used in all applications wherein epoxy resins find utility, such as the encapsulation of electrical parts and the like.

The preparation of the nonflammable polymers containing phosphinate or phosphonate groups can be effected by heating a polymer containing phosphonite or phosphite groups at a temperature generally above about 110° C., and below the decomposition temperature of the polymers being heated, generally at a temperature of about 130° C. to about 200° C., with the result that the phosphonite or phosphite groups rearrange to phosphinate or phosphonate groups, depending upon the dihalo organo phosphorus compound employed to produce the intermediate polymer. When the R in $RPX_2$ contains a carbon atom bonded directly to the phosphorus atom, as when R is alkyl, the rearranged polymer will contain phosphinate groups. When the R in the formula $RPX_2$ contains an oxygen atom bonded to the phosphorus atom, as when R is alkoxy, the rearranged polymer will contain phosphonate groups.

It is to be understood that the temperatures at which the phosphonite or phosphite-containing polymers rearrange to phosphinate or phosphonate-containing polymers will vary according to the structure of the initial polymers. Generally, it has been found that the rearrangement occurs at temperatures in excess of about 110° C.

The preparation of polymers containing phosphinate and phosphonate groups can be conducted using diluents and procedures identical to those described for the preparation of the phosphonite or phosphite-containing polymers.

The repeating units of phosphinate and phosphonate-containing polymers can be illustrated by the following:

A polymer having the repeating unit indicated in Reaction 1 will rearrange to a polymer having the following repeating unit:

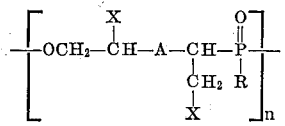

wherein $n$, X, A and R are as previously defined.

A polymer, as defined in Reaction 2, will rearrange to a polymer having the following formula:

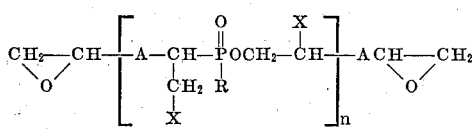

wherein $n$, A, X and R are as previously defined.

A polymer, as defined in Reaction 3, will rearrange to a polymer having the formula:

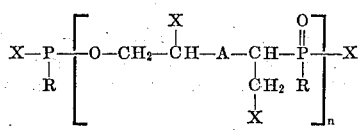

wherein $n$, A, X and R are as defined.

EXAMPLE 1

A. Preparation of a polymer containing phosphonite groups

Eighteen grams (0.1 mole) of dichlorophenylphosphine were added rapidly, with stirring, to a solution of 14 grams (0.1 mole) of 1,7-diepoxyoctane in 25 milliliters of benzene, under a nitrogen gas atmosphere. During the addition of the dichlorophenylphosphine, the temperature of the reaction mixture rose to 50° C. After this addition was completed, the temperature of the reaction mixture was raised to and maintained at 83° C. for four hours.

The polymer, which was recovered as a white solid upon the removal of the benzene under reduced pressure, showed (P—O—C) bands at 9.7–10μ when subjected to infrared analysis. Bands at 8.2μ and 12μ which would indicate the presence of (P=O) and

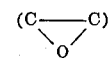

groups, respectively, were absent.

B. Preparation of a polymer containing phosphinate groups

The polymer of 1-A was heated to a temperature of 140° C. The temperature of the product then rose spontaneously to 182° C. Thirty-two grams of polymer were recovered. The presence of phosphinate groups and the absence of phosphonite groups in the polymer were confirmed by infrared analysis, the bands at 8.2μ indicating that phosphinate groups were present.

The polymer was a white, nonflammable tacky product having the properties noted below.

Brittle point, ° C. _____ 15
Reduced viscosity
 (0.2% concentration in benzene) _____ 0.061

Reduced viscosity values noted herein were determined by forming a solution having a concentration of 0.2% of polymer in benzene. The time required for efflux of the solvent and of the solutions through a viscosimeter at 30° C. was determined. Reduced viscosity was then calculated using the equation:

$$R.V. = \frac{T_1 - T_2}{T_2 C}$$

wherein $T_1$=efflux time for the polymer solution
$T_2$=efflux time for the solvent
$C$=concentration of the polymer solution The polymer was stable below 200° C., soluble in xylene, ethanol, acetone and ethylene dichloride, and insoluble in heptane, water and diethyl ether.

The phosphorus-containing polymers of the following examples can be isolated and confirmation of structure made according to the procedure of Example 1.

EXAMPLE 2

A. Preparation of a polymer containing phosponite groups

Seventeen and nine tenths grams (0.1 mole) of dichlorophenylphosphine were added, dropwise, to a solution of 31.5 grams (0.1 mole) of 3,4-epoxy-6-methylcyclohexylmethyl-3,4 - epoxy - 6 - methylcyclohexanecarboxylate in 40 ml. of xylene at 60° C., under a nitrogen gas atmosphere. During the addition of the dichlorophenylphosphine the temperature of the reaction mixture rose to 85° C. The reaction mixture was then allowed to stand for two hours.

B. Preparation of a polymer containing phosphinate groups

The solution of 2-A was heated at a temperature of 150° C. for three hours with the result that the phosphonite groups of the polymer rearranged to phosphinate groups. The reacted mixture was then poured into 800 ml. of hexane. The polymer, which precipitated out of solution, was recovered as a filter cake, washed twice with hexane and dried to constant weight in a vacuum oven. The polymer, recovered in an amount of 48 grams, was a soft, nonflammable product having a molecular weight of 585 and a brittle point of 20° C. The polymer was thermally stable up to a temperature of about 210° C.

EXAMPLE 3

A. Preparation of a polymer containing phosphonite groups

Seventeen and nine tenths grams (0.1 mole) of dichlorophenylphosphine were added, dropwise, to a solution of thirty-four and six tenths grams (0.1 mole) of diglycidylether of 2,2-bis-(p-hydroxyphenyl)propane in 40 milliliters of xylene, under a nitrogen gas atmosphere. During the addition of the dichlorophenylphosphine, the temperature was maintained at 50° C.

B. Preparation of a polymer containing phosphinate groups

The solution of 3–A was heated at a temperature of 147° C. for three hours with the result that the phosphonite groups of the polymer rearranged to phosphinate groups. The reacted mixture was diluted with 75 ml. of benzene and poured into 1000 ml. of hexane. The polymer, which precipitated out of solution, was washed twice with hexane and dried to constant weight in a vacuum oven. The polymer, recovered in an amount of 51 grams, was a nonflammable white powder which softened at 30° C. and had a reduced viscosity of 0.12.

EXAMPLE 4

A. Preparation of a polymer containing phosphonite groups

Seventeen and nine tenths grams (0.1 mole) of dichlorophenylphosphine were added, dropwise, to a solution of 39.4 grams (0.1 mole) of bis(3,4-epoxy-6-methylcyclohexylmethyl)adipate in 30 ml. of benzene, under a nitrogen gas atmosphere. During the addition of dichlorophenylphosphine, the temperature of the reaction mixture rose to 83° C. After the addition, the reaction mixture was heated at reflux for two hours. The polymer was recovered on removing the solvent by distillation.

B. Preparation of a polymer containing phosphinate groups

The polymer of 4–A was heated at a temperature of 150° C. for one hour with the result that the phosphonite groups of the polymer rearranged to phosphinate groups. The polymer was dissolved in benzene, precipitated from heptane and recovered as a filter cake. The polymer had a brittle point of 18° C. and a molecular weight of 724, as determined by vapor phase osmometry.

EXAMPLE 5

A. Preparation of a polymer containing phosphonite groups

Seventeen and nine tenths grams (0.1 mole) of dichlorophenylphosphine were added to a solution of 14 grams (0.1 mole) of vinylcyclohexene diepoxide in 25 ml. of benzene over a two hour period. The reaction mixture was then maintained at a temperature of 82° C. for two hours. The polymer was recovered on removing the solvent by distillation.

B. Preparation of a polymer containing phosphinate groups

The polymer of 5–A was heated to a temperature of 170° C. with the result that the phosphonite groups of the polymer rearranged to phosphinate groups as evidenced in part by the exothermic nature of the process. The polymer was dissolved in benzene, precipitated from hexane, recovered as a filter cake and dried to constant weight in a vacuum oven. The polymer, obtained as a white powder, softened at 46° C. and had a molecular weight of 1200.

EXAMPLE 6

A. Preparation of a polymer containing phosphonite groups

Seventeen and nine tenths grams (0.1 mole) of dichlorophenylphosphine were added, over a period of 45 minutes, to a solution of 16.8 grams (0.1 mole) of 2-methyl-1,2-epoxy-2-(4 - methyl - 3,4 - epoxycyclohexyl)ethane in 25 milliliters of benzene. The temperature of the reaction mixture rose to 82° C. during the addition of dichlorophenylphosphine.

B. Preparation of a polymer containing phosphinate groups

The preparation of this polymer was effected by the procedure described in Example 5–B.

EXAMPLE 7

Seven and nine tenths grams (0.044 mole) of dichlorophenylphosphine were added, dropwise, to a solution of 19.1 grams (0.044 mole) of bis(3,4-epoxy-6-methylcyclohexylmethyl)maleate in 30 milliliters of benzene, under a nitrogen gas atmosphere. During the addition of the dichlorophenylphosphine, the temperature of the reaction mixture rose to 60° C. After the addition was complete, the reaction mixture was heated to 83° C. whereupon the mixture gelled. The benzene was evaporated and the residue was heated to 200° C. The polymer recovered was a white, nonflammable solid which was thermally stable at 200° C. and contained (P=O) groups.

EXAMPLE 8

A. Preparation of a polymer containing phosphonite groups

Seventeen and nine-tenths grams (0.1 mole) of dichlorophenylphosphine were added, dropwise, over a period of 45 minutes, to a solution of 16.4 grams (0.1 mole) of dicyclopentadiene diepoxide in 40 ml. of xylene, under a nitrogen gas atmosphere, and while the temperature of the reaction mixture was maintained at about 60° C. After the addition of the dichlorophenylphosphine, the reaction mixture was maintained at a temperature of about 70° C. for about two hours.

B. Preparation of a polymer containing phosphinate groups

The polymer-containing solution of 8–A in xylene was heated for one hour at a temperature of 147° C. with the result that the phosphonite groups of the polymer rearranged to phosphinate groups.

The polymer, recovered in a manner as described in Example 5, was a white nonflammable powder having a reduced viscosity of 0.013.

EXAMPLE 9

A. Preparation of a polymer containing phosphonite groups

Six and six-tenths grams (0.05 mole) of dichloroethylphosphine were slowly added to a solution of 7.1 grams (0.05 mole) of 1,7-diepoxyoctane in 20 ml. of benzene while the mixture was kept under a nitrogen gas atmosphere and kept at a temperature of 35° C. The reaction mixture was allowed to stand at room temperature for four days. The polymer solution analyzed by IR analysis showed an absence of (P=O) groups.

B. Preparation of a polymer containing phosphinate groups

The polymer-containing solution of 9–A was heated to a temperature of 180° C. with the result that the phosphonite groups of the polymer rearranged to phosphinate groups.

The polymer recovered in a manner described in Example 5–B was a viscous syrup which had a reduced viscosity of 0.038.

EXAMPLE 10

A. Preparation of a polymer containing phosphite groups

Beta-chloroethyldichlorophosphite, in an amount of 9.07 grams (0.05 mole) was added, dropwise, over a period of 30 minutes, to a solution of 7.11 grams (0.05 mole) of 1,7-diepoxyoctane in 20 ml. of benzene, under a nitrogen gas atmosphere. After the addition of the beta-chloroethyldichlorophosphite, the reaction mixture was allowed to stand for thirty minutes.

B. Preparation of a polymer containing phosphonate groups

The polymer-containing solution of 10–A was heated to a temperature of 82° C. and maintained at this temperature for 20 minutes. At the end of the 20 minute period the polymer had precipitated out of solution. The polymer was recovered as a filter cake, washed with hexane and vacuum dried to constant weight. Sixteen grams of polymer were obtained. The polymer was a soft nonflammable solid that was soluble in acetone and ethylene dichloride. Phosphonate groups of the polymer were confirmed by infrared analysis. This analysis showed absorption bands at 8.0μ and 10.0μ which are indicative of (P=O) groups and (P—O—C) groups.

EXAMPLE 11

Preparation of a polymer containing phosphite groups

Beta-bromoethyldibromophosphite, in an amount of 15.59 grams (0.05 mole), was added, dropwise, over a period of 30 minutes, to a stirred solution of 7.11 grams (0.05 mole) of 1,7-diepoxyoctane in 15 ml. of benzene, under a nitrogen gas atmosphere. The polymer precipitated from solution 30 minutes after the addition was completed. A nonflammable, white solid polymer was recovered in a manner as described in Example 5–A. As in Example 1–A, the presence of phosphite groups was confirmed by IR analysis.

EXAMPLE 12

Preparation of a polymer containing phosphonate groups

Beta-bromoethyldibromophosphite, in an amount of 15.6 grams (0.05 mole), was added, dropwise, over a period of 40 minutes, to a stirred solution of 15.7 grams (0.05 mole) of 3,4-epoxy-6-methylcyclohexylmethyl-3,4-epoxy-6-methylcyclohexane-carboxylate, under a nitrogen gas atmoshpere. The benzene was removed by distillation and the product was then heated to 160° C. The product was then dissolved in ethylene dichloride, precipitated by adding hexane and dried to constant weight. The polymer was nonflammable, thermally stable at 180° C. and soluble in ethylene dichloride and tetrahydrofuran. The presence of the (P=O) )and (P—O—C) groups was confirmed by IR analysis.

EXAMPLE 13

Preparation of a polymer containing terminal epoxy groups

Dichlorophenylphosphine, in an amount of 5.37 grams (0.03 mole) was added slowly, with stirring, to 8.53 grams (0.06 mole) of 1,7-diepoxyoctane under a nitrogen gas atmosphere. After the exothermic reaction had subsided, the reaction mixture was heated to a temperature of 150° C. with the result that the phosphonite groups rearranged to phosphinate groups. The polymer was a colorless, viscous liquid. Infrared analysis of the product confirmed the presence of (P=O), (P—O—C) and epoxy groups.

EXAMPLE 14

The diepoxide of Example 13 (13.9 grams, 0.060 equivalents) was cured using various curing agents. The curing agents used are noted in the table below, along with properties of the cured products.

Composition A

Curing agent _ 1.32 grams (0.060 equivalents) of diethylene triamine.
Curing cycle _. 18 hours at 27° C.; 12 hours at 120° C.
Properties ____. Hard, brittle, solid, nonflammable, excellent adhesion to glass.

Composition B

Curing agent _ 0.7 grams of BF₃-piperidine catalyst.
Curing cycle _. 18 hours at 120° C.
Properties ____. Transparent, hard, brittle, solid, nonflammable, excellent adhesion to glass.

Composition C

Curing agent _. Mixture of 2.35 grams (0.048 equivalents of maleic anhydride), 0.49 grams (0.012 equivalents of ethylene glycol), 0.02 grams of N,N-dimethylbenzylamine.
Curing cycle _. 15 hours at 120° C.
Properties ____. Dark colored, flexible solid, nonflammable, excellent adhesion to glass.

EXAMPLE 15

A polymer containing terminal epoxy groups was prepared by reacting dichlorophenylphosphine (5.37 grams, 0.03 mole) with 3,4-epoxy-6-methylcyclohexylmethyl-3,4-epoxy-6-methylcyclohexane-carboxylate (18.87 grams, 0.06 mole) in a manner as described in Example 13. The polymer was cured by admixing therewith the curing agents of Composition B and Composition C of Example 14 and subjecting the resultant compositions to the same curing cycles in each instance. In each instance a transparent, hard, nonflammable solid was produced.

What is claimed is:

1. A polymer which is the reaction product of a dihalo organo phosphorus compound formula $$RPX_2$$

wherein R is a monovalent hydrocarbon radical containing from about 1 to about 18 carbon atoms, X is a halogen and P is a trivalent phosphorus atom; and a vicinal diepoxide, wherein the dihalo organo phosphorus compound is present in an amount of from about 0.5 mole per mole of diepoxide to about two moles per mole of diepoxide.

2. A polymer as defined in claim 1 wherein R is alkyl.
3. A polymer as defined in claim 1 wherein R is alkoxy.
4. A polymer as defined in claim 1 wherein the diepoxide is a diglycidylether of bis(hydroxyphenyl)alkane.
5. A polymer as defined in claim 1 wherein the dihalo organo phosphorus compound is dichlorophenylphosphine.
6. A polymer as defined in claim 1 wherein the diepoxide is 1,7-diepoxyoctane.
7. A polymer as defined in claim 1 wherein the diepoxide is 3,4 - epoxy - 6 - methyl - cyclohexylmethyl 3,4-epoxy-6-methylcyclohexanecarboxylate.
8. A polymer as defined in claim 1 wherein the diepoxide is diglycidylether of 2,2-bis(p-hydroxyphenyl)propane.
9. A polymer as defined in claim 1 wherein the diepoxide is bis(3,4-epoxy-6-methylcyclohexylmethyl)adipate.
10. A polymer as defined in claim 1 wherein the diepoxide is vinylcyclohexene diepoxide.
11. A polymer as defined in claim 1 wherein the diepoxide is 2-methyl-1,2-epoxy-2-(4-methyl-3,4-epoxycyclohexyl)ethane.
12. A polymer as defined in claim 1 wherein the diepoxide is bis(3,4 - epoxy - 6 - methylcyclohexylmethyl)maleate.
13. A polymer as defined in claim 1 wherein the diepoxide is dicyclopentadiene diepoxide.
14. A polymer as defined in claim 1 wherein the diepoxide is bis(2,3-epoxycyclopentyl)ether.
15. A polymer having the formula:

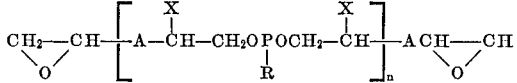

wherein $n$ is an integer having a value of at least one, A is the nucleus of a vicinal diepoxide, R is a monovalent hydrocarbon radical containing from about 1 to about 18 carbon atoms and X is a halogen atom.

16. A polymer having the formula:

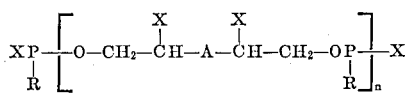

wherein *n* is an integer having a value of at least one, A is the nucleus of a vicinal diepoxide, R is a monovalent hydrocarbon radical containing from about 1 to about 18 carbon atoms and X is a halogen atom.

17. A polymer as defined in claim 1 wherein the dihalo organo phosphorus compound is beta-chloroethyldichlorophosphite.

18. A polymer as defined in claim 1 wherein the dihalo organo phosphorus compound is beta-bromoethyldibromophosphite.

19. A polymer, containing phosphinate groups, which is the rearrangement product of a polymer which in the reaction product of a dihalophosphine of the formula $$RPX_2$$

wherein R is a monovalent hydrocarbon radical containing from about 1 to about 18 carbon atoms, X is a halogen and P is a trivalent phosphorus atom; and a vicinal diepoxide, wherein the dihalo organo phosphorus compound is present in an amount of from about 0.5 mole per mole of diepoxide to about two moles per mole of diepoxide.

20. A polymer containing phosphinate groups, as defined in claim 19 wherein the diepoxide is diglycidyl ether of bis-(hydroxyphenyl)alkane.

21. A polymer, containing phosphinate groups, as defined in claim 19 wherein the dihalo organo phosphorus compound is dichlorophenylphosphine.

22. A polymer, containing phosphinate groups, as defined in claim 19 wherein the diepoxide is 1,7-diepoxyoctane.

23. A polymer, containing phosphinate groups, as defined in claim 19 wherein the diepoxide is 3,4-epoxy-6-methylcyclohexylmethyl 3,4 - epoxy-6-methylcyclohexane carboxylate.

24. A polymer containing phosphinate groups, as defined in claim 19 wherein the diepoxide is diglycidylether of 2,2-bis-(p-hydroxyphenyl)propane.

25. A polymer, containing phosphinate groups, as defined in claim 19 wherein the diepoxide is bis-(3,4-epoxy-6-methylcyclohexylmethyl)adipate.

26. A polymer, containing phosphinate groups, as defined in claim 19, wherein the diepoxide is vinylcyclohexene diepoxide.

27. A polymer, containing phosphinate groups, as defined in claim 19 wherein the diepoxide is 2-methyl-1,2-epoxy-2-(4-methyl-3,4-epoxycyclohexyl)ethane.

28. A polymer, containing phosphinate groups, as defined in claim 19 wherein the diepoxide is bis-(3,4-epoxy-6-methylcyclohexylmethyl)maleate.

29. A polymer, containing phosphinate groups, as defined in claim 19 wherein the diepoxide is dicyclopentadiene diepoxide.

30. A polymer containing phosphonate groups which is the rearrangement product of a polymer which is the reaction product of a dihalophosphite of the formula alkoxy PX₂ wherein the alkoxy radical contains from about 1 to about 18 carbon atoms, X is a halogen and P is a trivalent phosphorus atom; and a vicinal diepoxide, wherein the dihalo organo phosphorus compound is present in an amount of from about 0.5 mole per mole of diepoxide to about two moles per mole of diepoxide.

31. A polymer containing phosphonate groups as defined in claim 30 wherein the dihalophosphite is dibromoethylphosphite.

32. A polymer containing phosphonate group as defined in claim 30 wherein the diepoxide is 1,7-diepoxyoctane.

33. A polymer having the repeating unit:

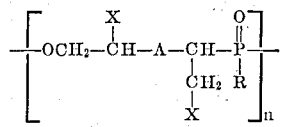

wherein *n* is an integer having a value of greater than 1, A is the nucleus of a vicinal diepoxide, R is a monovalent hydrocarbon radical containing from about 1 to about 18 carbon atoms and X is a halogen atom.

34. A polymer having the formula:

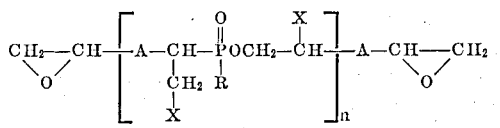

wherein *n* is an integer having a value of greater than 1, A is the nucleus of a vicinal diepoxide, R is a monovalent hydrocarbon radical containing from about 1 to about 18 carbon atoms and X is a halogen atom.

35. A polymer having the formula:

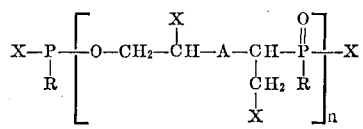

wherein *n* is an integer having a value of greater than 1, A is the nucleus of a vicinal diepoxide, R is a monovalent hydrocarbon radical containing from about 1 to about 18 carbon atoms and X is a halogen atom.

36. A polymer having the formula

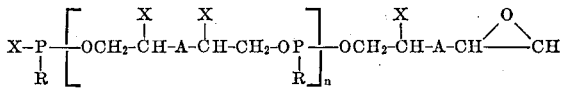

wherein *n* is an integer of at least one, A is the nucleus of a vicinal diepoxide, R is a monovalent hydrocarbon radical containing from about 1 to about 18 carbon atoms and X is a halogen atom.

References Cited

UNITED STATES PATENTS

| | | | |
|---|---|---|---|
| 3,310,503 | 3/1967 | Huwyler et al. | 260—2 |
| 3,257,337 | 6/1966 | Schoepfle et al. | 260—75 |
| 3,138,570 | 6/1964 | Fowler et al. | 260—2 |
| 3,027,349 | 3/1962 | Bahr et al. | |

OTHER REFERENCES

SPE Transactions, January 1964, Boyer et al. (pp. 45, 46, 51–54 relied on) 260FP Digest.

WILLIAM H. SHORT, *Primary Examiner.*

T. E. PERTILLA, *Assistant Examiner.*